2 Sheets—Sheet 1.
D. H. BURRELL & G. L. FREEMAN
Dairy Vat.
No. 243,503.          Patented June 28, 1881.
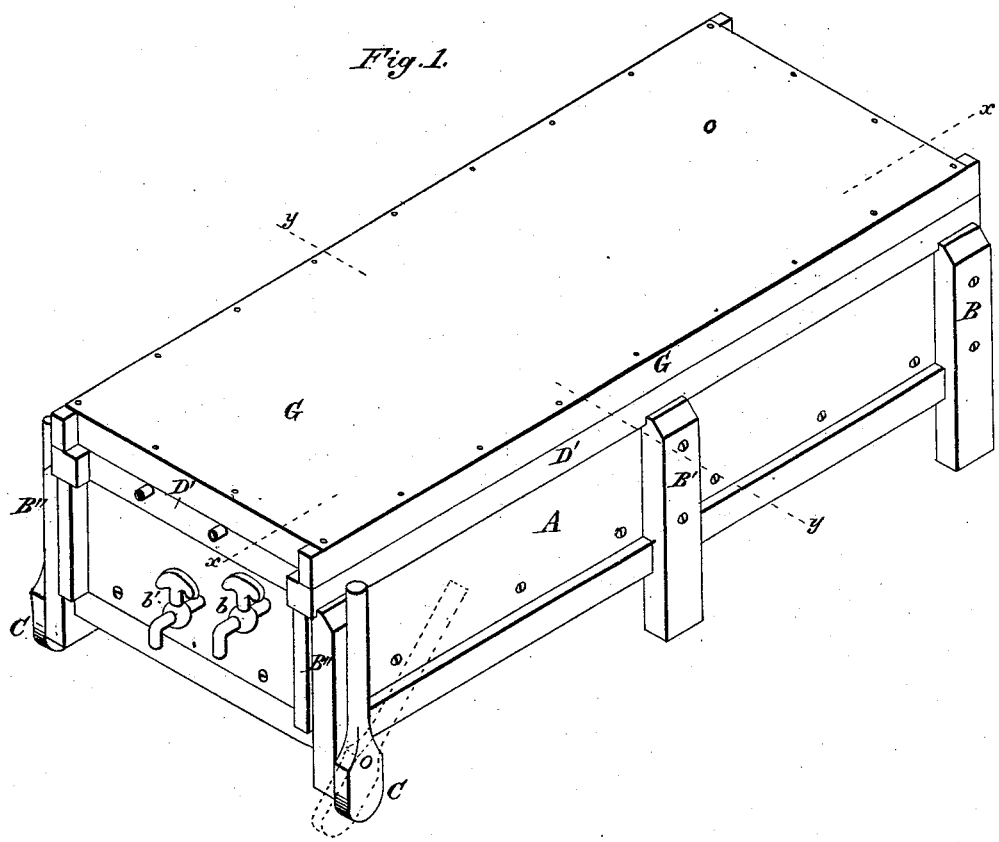
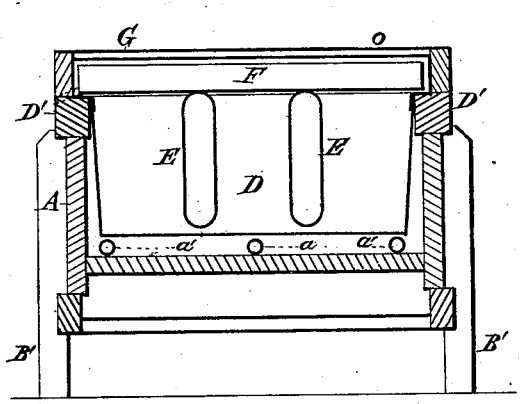

2 Sheets—Sheet 2.
D. H. BURRELL & G. L. FREEMAN
Dairy Vat.
No. 243,503. Patented June 28, 1881.
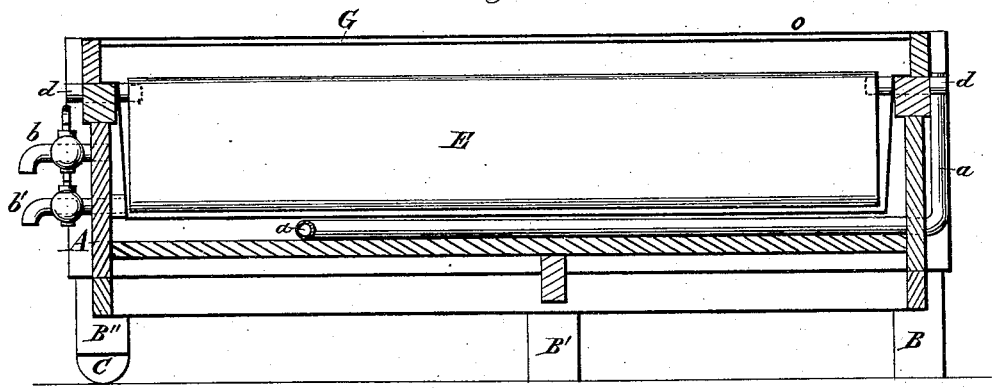
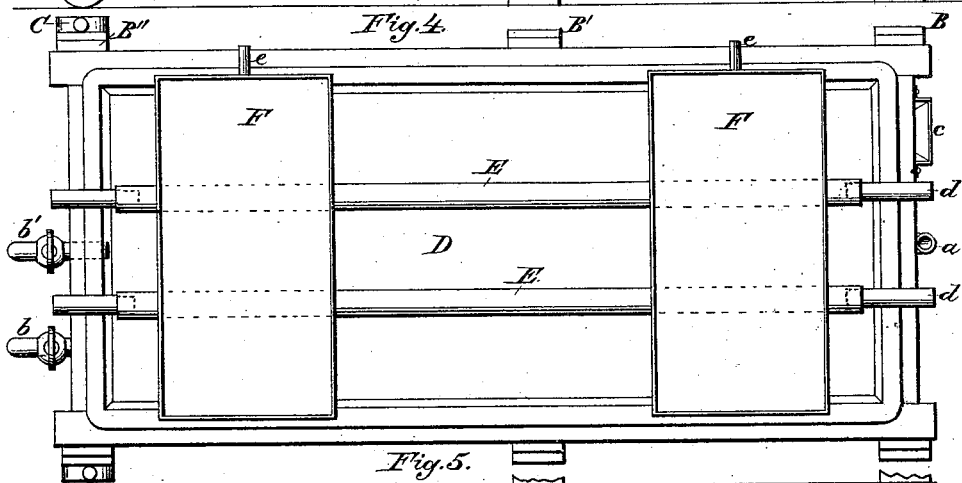
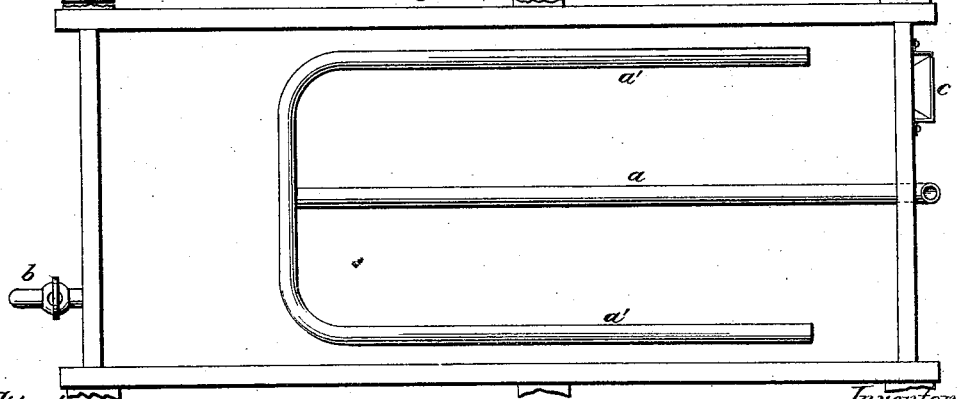

UNITED STATES PATENT OFFICE.

DAVID H. BURRELL AND GEORGE L. FREEMAN, OF LITTLE FALLS, N. Y.

DAIRY-VAT.

SPECIFICATION forming part of Letters Patent No. 243,503, dated June 28, 1881.

Application filed April 7, 1879.

*To all whom it may concern:*

Be it known that we, DAVID H. BURRELL and GEORGE L. FREEMAN, both of Little Falls, in the county of Herkimer and State of New York, have invented certain new and useful Improvements in Dairy-Vats; and we do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to that class of milk-vats which are employed alternately for heating and refrigerating purposes, so that the milk may be quickly heated to the degree required and then as rapidly cooled, or so that it may be maintained at any desired temperature for a sufficient length of time to facilitate the various operations and processes practiced during the manufacture of butter and cheese.

The object of the invention is to provide for certain improvements in the cheese-vat for which Letters Patent No. 203,952 were granted to Smith, Freeman, and Burrell, May 21, 1878; and the invention consists in the construction and arrangement of the various parts of a dairy-vat, as hereinafter described and claimed.

Figure 1 is a perspective view of the vat complete. Fig. 2 is a longitudinal section of Fig. 1 on the line $x\ x$. Fig. 3 is a transverse section on the line $y\ y$ of Fig. 1. Fig. 4 is a plan of the vat with the cover removed. Fig. 5 is a plan with cover, ice-pan, and milk-pan removed.

The frame which supports this vat, together with the vat or tank A, is preferably formed of wood, as presenting a strong and cheap material, which also possesses the property of being a very perfect non-conductor of heat, thus keeping its contents for long periods with but slight change of temperature. This tank presents the appearance of an oblong box mounted at one end upon the legs B, and with the legs B' placed near the middle of its length, but a little nearer to that end of the tank which is supported by the legs B than to the opposite end, so that, when free to do so, the end of the tank provided with the outlets will tip down, the legs B' forming the fulcrum and the legs B rising from the floor. An additional pair of legs, B'', are attached to the outlet or dropping end of the tank, but are shorter than the others, their length being supplemented by the pivoted feet C, which, when in an upright position, bear upon the floor and keep the tank level, but when turned, as indicated by the dotted lines in Fig. 1, let that end of the tank tip down, thus allowing its contents, as well as those of the milk-pan, to be drawn without difficulty.

A pipe, $a$, the open end of which is turned up and rises as high as the side of the vat, is introduced into the vat through one of its ends, and passes along its bottom nearly its whole length, ending in the two return branches $a'$ $a'$, as shown in Fig. 5, which bring the current of hot or cold fluid passing through the pipes nearly back to the point where it entered the vat. It will be apparent that the convolutions of these pipes upon the bottom of the vat may be made more or less in number, as may be found best suited to the purpose aimed at—namely, affording a ready means of introducing either a heating or cooling fluid into the space within the vat surrounding the milk-pan for the purpose of increasing or reducing the temperature of the latter, as may be found necessary during the manipulation of its contents.

An outlet or overflow cock, $b$, is placed in one end of the vat and prevents an overflow of water when it is introduced through the pipe $a$ or the funnel-shaped opening $c$ at the end of the vat. Other openings are made in the vat, if desired, at the lowest point in its bottom, so that its contents may be fully drained off without difficulty, thus enabling it to be kept perfectly clean and sweet.

The milk-pan D is an oblong metal box, supported upon an encircling frame, D', of substantially the same size as the vat, the pan being enough smaller to afford space beneath it for the pipes $a$ and $a'$, and at the sides for the free circulation of fluids between it and the sides of the vat. The frame D' fits snugly upon the top of the vat A, so as to prevent the escape of steam or other fluids through the joint between them, but at the same time admits of the removal of the milk-pan after the cock $b'$, through which the contents of the pan are drawn off, has been removed. This milk-pan is preferably formed of metal, from the greater ease with which it is made clean, and its conducting-power, which causes it to instantly convey to its contents any change in the temperature of the fluid by which it is surrounded.

Within the milk-pan D are arranged the removable conduits E, which are provided with pipes $d\ d$, that rest in bearings in the frame D', and thus suspend the conduits in such a manner as to allow them a free swinging motion. These conduits are each made in the form of a deep narrow vessel, oblong in cross-section, and with rectangular parallel sides. They extend nearly to the bottom and ends of the milk-pan, and thus serve to imperfectly divide the volume of milk or curd into several smaller ones. Being provided with the pipes $d\ d$, through which steam, water, or other fluid may be passed to their interior, it will be apparent that the contents of the milk-pan may be readily brought in contact with a large surface of a different temperature whenever it is desired to effect a change in the same. The manner of suspending the conduits, by means of the pipes $d\ d$, also facilitates their removal when it is desired to use the vat in cheese-making.

It will be observed that by the use of these deep and narrow conduits the milk contained in the milk-pan D is divided into three or more volumes, each of which has presented to it a much larger heating or cooling surface than could be otherwise obtained, except perhaps by the employment of a coil or series of pipes to convey the heating or cooling medium. These conduits, however, are more cheaply constructed than a coil of pipes, and may be more readily cleansed and kept in repair. When arranged as above described the conduits also possess the additional advantage of being more useful in conveying heat to ripen and sour the curd, as they may be readily removed after the curd has set without danger of breaking and withdrawing portions of the curd, as is liable to occur when pipes are used.

In employing conduits composed of pipes it is obvious that the curd will become more or less attached to the coils of such pipes, filling the interstices between them, and thus be broken and drawn out of the vat when the conduits are removed.

Across the top of the milk-pan D are placed two or more ice-pans, F, each of which is provided with an outlet-spout, $e$, which projects through a groove formed for their reception in the edge of the frame D'. These spouts carry the water produced by the melting of the ice outside the vat, and prevent all chance of its becoming mixed with the contents of the milk-pans. The use of these ice-pans is to enable the manufacturer to quickly cool the contents of the milk-pan when necessary, as owing to the well-known tendency of cold air to descend the surface of the milk in the pan is quickly brought in contact with a stream of cold air until the whole contents of the pan have been cooled to the proper point.

A cover, G, is provided which fits snugly down upon the top of the milk-pan, and being provided with suitable packing prevents all entrance of external air, as well as sudden changes in the temperature of the contents of the milk-pan when it has been brought to the desired point. In order to make this cover perform its functions satisfactorily, it is formed by first making a frame of about the same size and shape as the frame D', which supports the milk-pan, and upon the top of this is secured a metal or other suitable plate, $o$; or the top may be made of wood or paper, &c. The cover is provided with a rubber or other suitable packing secured to its edges, so as to form a tight joint when closed, and thus exclude the external air; and it may be constructed with an air-space, so as to form a more perfect non-conductor of heat or cold; or it may be lined with paper, felt, or asbestus for the same reason. This cover is found of the greatest service, and may be readily applied to vats now in general use in cheese and butter making with manifest advantage, its use being to prevent all sudden changes in the temperature of the air over the milk, as well as to stop the entrance of extraneous matter which might deteriorate the quality of the contents of the milk-pan. A further advantage gained by the use of this cover is that when making cheese in cool weather and the curd is cooking in the vat, by putting the cover in place the cold air is excluded, and also after the whey has been run off and the curd packed up in the vat to sour or ripen, a process which in cold weather often takes a long time, thereby delaying other operations, we are enabled to expedite the process by placing the cover in position and sending a jet of steam directly inside the vat, which, enveloping and surrounding the curd, warms it up and greatly facilitates the ripening process.

Having thus described our invention, we claim as new, and desire to secure by Letters Patent, the following:

The removable conduits E, being oblong in cross-section and arranged in the milk-pan D so as to divide its contents into two or more volumes, substantially as shown and described.

In testimony that we claim the foregoing as our own we hereunto affix our signatures in presence of two witnesses.

DAVID H. BURRELL.
GEORGE L. FREEMAN.

Witnesses:
S. W. DILLENBECK,
WALTER W. WHITMAN.